United States Patent
Müller et al.

(10) Patent No.: US 12,085,425 B2
(45) Date of Patent: Sep. 10, 2024

(54) METHOD FOR DETECTING THE POSITION OF A MOVABLE PART AND A SYSTEM FOR CARRYING OUT THE METHOD

(71) Applicant: SEW-EURODRIVE GMBH & CO. KG, Bruchsal (DE)

(72) Inventors: Michael Müller, Karlsdorf-Neuthard (DE); Manuel Heil, Eggenstein-Leopoldshafen (DE); Matthias Rümmele, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 66 days.

(21) Appl. No.: 17/774,168

(22) PCT Filed: Oct. 19, 2020

(86) PCT No.: PCT/EP2020/025464
§ 371 (c)(1),
(2) Date: May 4, 2022

(87) PCT Pub. No.: WO2021/089182
PCT Pub. Date: May 14, 2021

(65) Prior Publication Data
US 2022/0373361 A1 Nov. 24, 2022

(30) Foreign Application Priority Data
Nov. 4, 2019 (DE) .......................... 102019007616.8

(51) Int. Cl.
*G01D 5/244* (2006.01)
*G01D 5/34* (2006.01)

(52) U.S. Cl.
CPC ........... *G01D 5/24476* (2013.01); *G01D 5/34* (2013.01)

(58) Field of Classification Search
CPC ............................ G01D 5/24476; G01D 5/34
See application file for complete search history.

(56) References Cited

U.S. PATENT DOCUMENTS

| 6,948,382 B2 | 9/2005 | Sakai |
| 7,408,315 B2 | 8/2008 | Tsubota |
| (Continued) | | |

FOREIGN PATENT DOCUMENTS

| DE | 102006043878 A1 | 5/2007 |
| DE | 60310860 T2 | 8/2007 |
| (Continued) | | |

OTHER PUBLICATIONS

International Report on Patentability issued in corresponding International Application No. PCT/EP2020/025464 dated May 10, 2022, pp. 1-9, English Translation.

(Continued)

*Primary Examiner* — Christopher P McAndrew
*Assistant Examiner* — Zannatul Ferdous
(74) *Attorney, Agent, or Firm* — Carter, DeLuca & Farrell LLP

(57) ABSTRACT

In a method for detecting the position of a movable part by a sensor which, as sensor signals coding the position, has a first signal and a second signal, the position detected by the sensor is coded by the first and second signal, an actual variable is determined from the sensor signals in a chronologically recurring manner, the determination of a control value is triggered by a trigger signal, the determination of the control value is executed such that the actual variable is regulated toward a target variable.

22 Claims, 1 Drawing Sheet

(56) References Cited

U.S. PATENT DOCUMENTS

| | | | | |
|---|---|---|---|---|
| 2002/0168004 A1* | 11/2002 | Boice | ............... | H04N 21/44004 |
| | | | | 375/E7.181 |
| 2009/0190283 A1* | 7/2009 | Hammerschmidt | .. | H03L 7/0805 |
| | | | | 361/240 |
| 2015/0112634 A1* | 4/2015 | Shimizu | ................. | G01D 3/036 |
| | | | | 702/151 |
| 2016/0377452 A1* | 12/2016 | Heineck | ................... | G01D 5/12 |
| | | | | 324/207.11 |

FOREIGN PATENT DOCUMENTS

| | | |
|---|---|---|
| JP | H0194217 A | 4/1989 |
| JP | 20140122885 A | 7/2014 |

OTHER PUBLICATIONS

International Search Report issued in corresponding International Application No. PCT/EP2020/025464 dated Feb. 8, 2021, pp. 1-3, English Translation.

\* cited by examiner

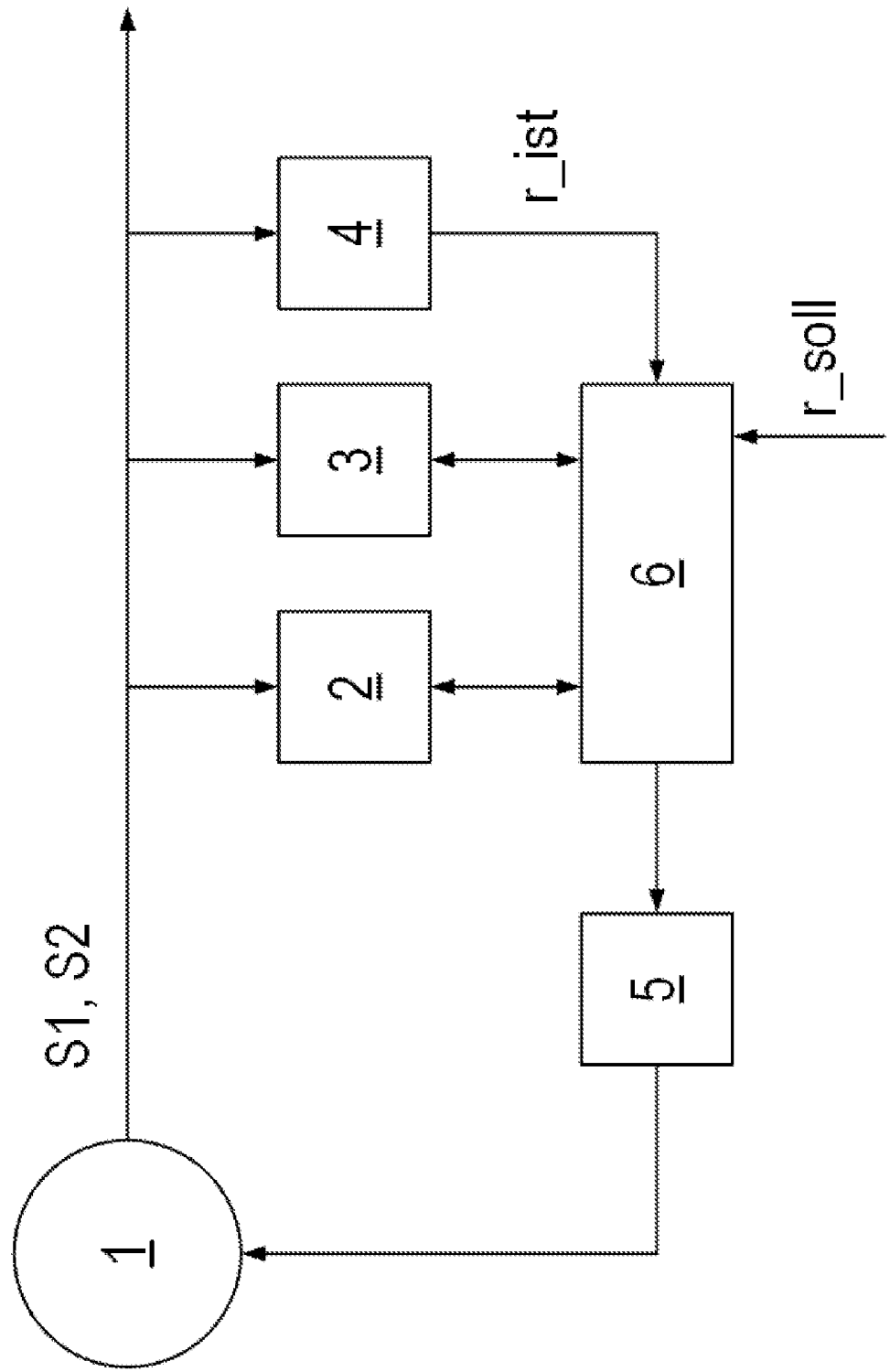

METHOD FOR DETECTING THE POSITION OF A MOVABLE PART AND A SYSTEM FOR CARRYING OUT THE METHOD

FIELD OF THE INVENTION

The present invention relates to a method for detecting the position of a movable part and a system for carrying out the method.

BACKGROUND INFORMATION

In certain conventional arrangements, a sensor is used in a method for detecting the position of a movable part.

SUMMARY

Example embodiments of the present invention provide for correcting sensor signals generated by a sensor for angle detection.

According to an example embodiment of the present invention, in a method for detecting the position of a movable part, e.g., for detecting the angular position of a rotatably mounted part or for detecting the linear position of a part arranged to be linearly movable, by a sensor which, as sensor signals coding the position, has a first signal, e.g., a sine signal, and a second signal, e.g., a cosine signal, the position detected by the sensor is coded by the first and second signal, an actual variable is determined from the sensor signals in a chronologically recurring manner, the determination of a control value, e.g., a respective updated control value, is triggered by a trigger signal, e.g., a respective trigger signal, e.g., by a trigger pulse, in which the determination of the control value is executed such that the actual variable is regulated toward a setpoint variable, the control value first changes with the respective next determination triggered by a respective further trigger signal, and the control value determined by the determination triggered by the trigger signal remains unchanged until the chronologically successive and/or respective further trigger signal.

It is considered advantageous that the signals generated by the sensor, which encode the detected position, e.g., the angle, i.e., the angular position of the part, or the linear position of the part, can be regulated toward a setpoint value without deactivating safety-related monitoring.

This is because while the angular position detected and coded by the signals passes through an electrical angle, correction is not carried out as long as a minimum time t is not exceeded. Safety-oriented monitoring of the sensor signals is thus capable of recognizing a fault. For example, a defect occurs, so that one of the signals or both signals lose amplitude. This is recognizable since no correction of the signals is carried out. A control value which causes a correction is only determined when the electrical period has passed or the time span t has expired. The control value is determined such that the peak value, i.e., the amplitude, of the signals is the same. For example, the signals are arranged as a sine signal and a cosine signal and the regulation causes the pointer coded from sine signal and cosign signal to pass through a circle, thus the least possible eccentricity as a deviation deviates from the desired circle having given radius.

Safety-oriented monitoring is thus executable while passing through an electrical period and a new control value is determinable at the beginning of the next electrical period, for example, to readjust a luminosity of an optical source of the sensor or to readjust the reception-side amplification factor of the sensor.

According to example embodiments, the control value controls or is an excitation voltage or an excitation current of the sensor and/or an amplification factor of the sensor. It is considered advantageous that simple readjustment of the signals is provided.

According to example embodiments, a trigger signal is triggered when the position coded by the first and second signal has changed by a distance corresponding to the electrical period, e.g., an angular length or linear length, and/or by a maximum distance that can be coded by means of the first and second signal, e.g., angular length or linear length, since the respective previously triggered trigger signal. The advantage is that the control value is not changed between two trigger signals, so that safety-related monitoring of the signals is executable undisturbed.

According to example embodiments, a trigger signal is triggered when a time span t since the respective previously triggered trigger signal has passed, e.g., in which the time span t is greater than the period duration of the first signal when the speed of the part is sufficiently high or maximum that the position is still just unambiguously detectable. It is considered advantageous that an updated determination of the control value is executable at a standstill of the part at least after starting of the time span t.

According to example embodiments, the actual variable is formed as the root of a sum which is formed as the sum of the square of the value of the respective present first signal and the square of the value of the respective present second signal. It is considered advantageous that a radial distance is determinable in a simple manner, the abscissa value of which is equal to the first signal and the ordinate value of which is equal to the second signal.

According to example embodiments, the actual variable is formed as the two-tuple of the respective presently determined amplitude of the first signal and the respective presently determined amplitude of the second signal. The setpoint variable is also a two-tuple and a two-tuple of control values is determined instead of the control value. The advantage is that each of the two amplitudes of the sensor signals are each readjustable, e.g., correctable, separately.

According to an example embodiment of the present invention, in a system for carrying out a method described herein, the first and second signal are supplied to an analysis unit and also a timing element and also a measuring element, the evaluation unit is adapted to determine an actual variable, e.g., to determine a floating average of an actual variable, the timing element is adapted to generate a trigger signal after passage of a time span after the last generated trigger signal, the measuring element is adapted to generate a trigger signal after passing through an electrical period after the last generated trigger signal, and a controller element is adapted to execute a determination of an updated control value respectively triggered by a trigger signal.

It is considered advantageous that a trigger signal which triggers the determination of an updated control value is always generated after passing through an electrical period or passage of a time span. In this manner, the control value is always only determined after the arrival of a new trigger signal and thus the safety-oriented monitoring of the signals of the sensor is not disturbed.

According to example embodiments, by the output signal generated by the controller element and containing the control value the current flowing through a light source, e.g., an LED, of the sensor and/or the amplification factor of a unit of the sensor evaluating the signal of a light-sensitive sensor element is controlled or the amplitude of an electrical alternating variable, such as current or voltage, of a winding, which functions as the primary winding and is arranged in a stationary manner, is controlled, and a secondary winding is fixedly connected to the part.

It is considered advantageous that after each trigger signal the luminosity, i.e., light intensity, of the light source of the sensor and/or of the sensor part arranged on the receiving side, e.g., fixedly connected to the part, is changed in order to achieve the setpoint value.

According to example embodiments, the signals of the sensor are supplied to a unit for safety-oriented monitoring. It is considered advantageous that such monitoring is executable between the trigger signals and is not corrupted by updated control values.

Further features and aspects of example embodiments of the present invention are explained in more detail with reference to the appended schematic Figure.

BRIEF DESCRIPTION OF THE DRAWING

FIG. 1 schematically illustrates a method according to an example embodiment of the present invention for sensor signal correction.

DETAILED DESCRIPTION

As shown in FIG. 1, a sensor generates a sine signal S1 and a cosine signal. For this purpose, the sensor 1 is a linear distance measuring system or angle measuring system for detecting the position, e.g., linear position or angular position, of a movable part, e.g., linearly or rotationally movable part.

For example, by the sensor 1, the rotational angular position of a rotatably mounted part is detected, which has permanent magnets arranged in succession on the circumference in the circumferential direction and regularly spaced apart from one another, which are alternately magnetized in opposition in the circumferential direction. A magnet-sensitive sensor element arranged in a stationary manner thus generates a sine signal S1 during rotation of the part, which has the so-called electrical period length L, which is 720°/N, in which N is the number of the permanent magnets on the circumference. A further sensor element, which is also arranged in a stationary manner at the distance L/4 in the circumferential direction, generates a cosine signal S2.

The two signals S1 and S2 are supplied to an evaluation unit 4, which forms therefrom an actual variable, for example, an actual absolute value R_ist of the radius vector formed from the sine signal S1 and the cosine signal S2.

This actual variable R_ist is ascertained recurrently, e.g., quasi-continuously, and is, for example, smoothed, e.g., as a moving average, etc.

The measuring element 3 determines the distance covered by the movably arranged part and generates a trigger signal when the electrical period length L has been covered.

This trigger signal releases the determination of a new control value, which is determined by a controller element 6 in that the actual variable R_ist is compared to a predefined setpoint variable R_soll and a control value is determined such that the actual variable R_ist is regulated toward the setpoint variable R_soll.

The next control value is thus determined and becomes active upon the next trigger signal.

In this manner, phase-dependent errors are not distance corrected during the passage of the electrical period length L, but remain recognizable. The radial distance formed in the example as the root of the sum of the square of the sine signal and the square of the cosine signal and determined as a moving average is thus controlled towards a setpoint value, in which the control value is changed only once per electrical period.

In addition to the measuring element 3, the timing element 2 is provided, which can also generate a trigger signal. Specifically, if the movement of the movable part is very slow, the timing element 2 generates a trigger signal after a time span t in order to trigger the determination of the next control value by the controller element 6.

In this manner, a control value is determined only once per electrical period as long as the velocity or speed is above a threshold value, and otherwise after a maximum time, namely, the time span t.

The control value controls an excitation amplitude in the sensor 1 or an amplification factor in the sensor 1.

For example, the sensor 1 has a secondary winding inductively coupled to a primary winding. The primary winding is powered by a primary AC voltage, the amplitude of which, e.g., the excitation amplitude, is controlled by the control value. Alternatively or additionally, an amplification factor is controllable by the control value in the generation of the sine signal and/or the cosine signal. The actual variable is also controllable toward a setpoint variable, e.g., toward a setpoint value, in this manner.

Alternatively, the sensor is arranged as an optical sensor, in which a light source is arranged in a stationary manner, the intensity of which is controlled by the control value. Alternatively or additionally, an amplification factor is controllable by the control value in the generation of the sine signal and/or the cosine signal. The actual variable is also controllable toward a setpoint variable, e.g., toward a setpoint value, in this manner. If the light source is arranged as an LED, the intensity is controllable by the current flowing through the LED.

In exemplary embodiments, a two-tuple is used as the actual variable R_ist, e.g., the tuple composed of the amplitude of the sine signal S1 and the amplitude of the cosine signal S2. The setpoint value also includes two values, which can also be equal, however. The control variable also includes a two-tuple. The amplitudes of the sensor signals (S1, S2) are therefore controlled by the control value toward a respective, e.g., equal, setpoint value.

LIST OF REFERENCE CHARACTERS 1 sensor
2 timing element
3 measuring element
4 analysis unit
5 actuator
6 controller element
S1 sine signal
S2 cosine signal
R_ist actual vector
R_soll setpoint vector

The invention claimed is:

1. A method for detecting a position of a movable part by a sensor, of an angular position measuring device and/or a linear position measuring device, including, as sensor signals coding the angular and/or linear position of the movable part, a first signal and a second signal, comprising:

determining an actual variable from the sensor signals coding the angular and/or linear position of the movable part in a chronologically recurring manner; and triggering a determination of a control value by a trigger signal to regulate the actual variable toward a target value, the control value first changing with a respective next determination triggered by a respective further trigger signal, and the control value determined by the determination triggered by the trigger signal remaining unchanged until a chronologically successive and/or respective further trigger signal;

wherein the sensor is arranged as an optical sensor.

2. The method according to claim 1, wherein the position is an angular position and/or a linear position.

3. The method according to claim 1, wherein the first signal includes a sine signal and the second signal includes a cosine signal.

4. The method according to claim 1, wherein the position detected by the sensor is coded by the first signal and the second signal.

5. The method according to claim 1, wherein the trigger signal includes a trigger pulse.

6. The method according to claim 1, wherein the control value controls or is an excitation voltage or an excitation current of the sensor and/or an amplification factor of the sensor.

7. The method according to claim 1, wherein the trigger signal is triggered when the position coded by the first and second signal, since a previously-triggered trigger signal, has changed by (a) a distance corresponding to an electrical period, an angular length, and/or a linear length and/or (b), a maximum distance codable by the first and second signal, angular length, and/or linear length.

8. The method according to claim 1, wherein the trigger signal is triggered when a predetermined time period has passed since a previously-triggered trigger signal.

9. The method according to claim 8, wherein the predetermined time period is greater than a period duration of the first signal when a speed of the movable part is sufficiently high or maximum that the position is still just unambiguously detectable.

10. The method according to claim 1, wherein the actual variable is formed as a root of a sum of a square of a value of the first signal and a square of a value of the second signal.

11. The method according to claim 1, wherein the actual variable is formed as a two-tuple of an amplitude of the first signal and an amplitude of the second signal, and the setpoint variable is a two-tuple, the method including determining a two-tuple of control values.

12. The method according to claim 1, wherein the signals of the sensor are monitored in a safety-oriented manner between each two successive trigger signals.

13. The method according to claim 12, wherein an error is displayed and/or reported upon a change of peak values, amplitudes, and/or an absolute value of a pointer coded by the two signals.

14. The method according to claim 1, further comprising:
receiving the first and second signals and generating a trigger signal after a predetermined time span has elapsed after a previously-generated trigger signal;
receiving the first and second signals and generating a trigger signal after passing through an electrical period after a previously-generated trigger signal; and
executing a determination of an updated control value triggered by a trigger signal.

15. The method according to claim 14, wherein the method includes determining a floating average of the actual variable.

16. The method according to claim 14, wherein by an output signal generated by controller element and containing the control value (a) current flowing through a light source and/or an LED of the sensor and/or an amplification factor of a unit of the sensor evaluating a signal of a light-sensitive sensor element is controlled and/or (b) an amplitude of an electrical alternating variable of a winding, arranged as a primary winding and arranged in a stationary manner, is controlled, and a secondary winding is fixedly connected to the part.

17. The method according to claim 16, wherein the electrical alternating variable of the winding includes a current and/or a voltage.

18. The method according to claim 14, wherein signals of the sensor are supplied to a unit adapted for safety-oriented monitoring.

19. The method according to claim 1, wherein the movable part is a rotatably mounted part, and the position is an angular position of the rotatably mounted part.

20. The method according to claim 1, wherein the movable part is a linearly movable part, and the position is a linear position of the linearly movable part.

21. A method for detecting a position of a movable part by a sensor including, as sensor signals coding the position, a first signal and a second signal, comprising:

determining an actual variable from the sensor signals in a chronologically recurring manner; and triggering a determination of a control value by a trigger signal to regulate the actual variable toward a target value, the control value first changing with a respective next determination triggered by a respective further trigger signal, and the control value determined by the determination triggered by the trigger signal remaining unchanged until a chronologically successive and/or respective further trigger signal;

wherein the movable part is a rotatably mounted part, and the position is an angular position of the rotatably mounted part; and wherein the sensor is arranged as an optical sensor.

22. A method for detecting a position of a movable part by a sensor including, as sensor signals coding the position, a first signal and a second signal, comprising:

determining an actual variable from the sensor signals in a chronologically recurring manner; and triggering a determination of a control value by a trigger signal to regulate the actual variable toward a target value, the control value first changing with a respective next determination triggered by a respective further trigger signal, and the control value determined by the determination triggered by the trigger signal remaining unchanged until a chronologically successive and/or respective further trigger signal;

wherein the movable part is a linearly movable part, and the position is a linear position of the linearly movable part; and wherein the sensor is arranged as an optical sensor.

* * * * *